(12) United States Patent
Jaroch

(10) Patent No.: US 10,691,770 B2
(45) Date of Patent: Jun. 23, 2020

(54) REAL-TIME CLASSIFICATION OF EVOLVING DICTIONARIES

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 311 days.

(21) Appl. No.: 15/817,597

(22) Filed: Nov. 20, 2017

(65) Prior Publication Data
US 2019/0155918 A1    May 23, 2019

(51) Int. Cl.
| | | |
|---|---|---|
| G06F 16/00 | (2019.01) | |
| G06F 16/958 | (2019.01) | |
| H04L 29/08 | (2006.01) | |
| G06N 20/00 | (2019.01) | |
| G06Q 50/00 | (2012.01) | |
| G06F 40/30 | (2020.01) | |
| G06F 40/284 | (2020.01) | |

(52) U.S. Cl.
CPC .......... *G06F 16/958* (2019.01); *G06F 40/284* (2020.01); *G06F 40/30* (2020.01); *G06N 20/00* (2019.01); *G06Q 50/01* (2013.01); *H04L 67/1097* (2013.01)

(58) Field of Classification Search
CPC .... G06G 16/968; G06G 16/958; G06N 20/00; G06N 3/0454; G06N 3/084; G06N 3/086; G06Q 50/01; G06Q 30/0201; G10L 15/22; G06K 9/00315; G06K 9/00268; G06T 13/80; G06T 13/40; G06T 17/20; H04L 2012/644; H04L 45/70; H04L 45/26; H04L 45/46; H04L 45/02; H04L 67/1097; H04L 67/2842; H04L 12/44; G06F 16/24535; G06F 16/93; G06F 16/248; G06F 17/30011; G06F 17/30598; G06F 16/00; G06F 17/227; G06F 17/2785; G06F 17/27; G06F 17/30; G06F 3/0601; G06F 16/9535; G06F 3/011; G06F 16/176; G06F 17/30165; G06F 16/968; G06F 40/30; G06F 40/284
See application file for complete search history.

(56) References Cited

U.S. PATENT DOCUMENTS

| | | | |
|---|---|---|---|
| 10,318,405 B2 * | 6/2019 | Allen | G06F 11/3664 |
| 2007/0208569 A1 * | 9/2007 | Subramanian | G10L 19/0018 704/270 |

(Continued)

*Primary Examiner* — Anh Ly
(74) *Attorney, Agent, or Firm* — Barnes & Thornburg LLP

(57) ABSTRACT

A method including identifying an emotion identifier from a message using an emotion identifier table is provided. The method includes separating emotion identifier from the message, splitting a portion into multiple tokens delimited by a space or a punctuation mark, and determining a score for the message based on an emotion score in the emotion identifier table, and on at least one of the multiple tokens. The method includes adding a token from the multiple tokens to the emotion identifier table based on a contribution from the token to the message score, associating a sentiment score for the token in the emotion identifier table based on the contribution of the token to the message score, and modifying an emotion score of the token when the token is already included in the emotion identifier table based on the contribution of the token to the message sentiment score.

17 Claims, 9 Drawing Sheets

(56) References Cited

U.S. PATENT DOCUMENTS

| | | | |
|---|---|---|---|
| 2012/0089396 A1* | 4/2012 | Patel | G10L 25/00 704/249 |
| 2012/0185544 A1* | 7/2012 | Chang | G06Q 50/01 709/206 |
| 2012/0290511 A1* | 11/2012 | Frank | G06F 3/013 706/12 |
| 2013/0085106 A1* | 4/2013 | Pedersen | A61K 31/41 514/11.6 |
| 2013/0103624 A1* | 4/2013 | Thieberger | G06Q 10/063 706/12 |
| 2013/0132381 A1* | 5/2013 | Chakrabarti | G06F 16/532 707/730 |
| 2014/0002462 A1* | 1/2014 | Jiang | H04M 1/72544 345/473 |
| 2014/0282586 A1* | 9/2014 | Shear | G06F 9/5083 718/104 |
| 2015/0100537 A1* | 4/2015 | Grieves | G06N 5/048 706/52 |
| 2015/0127565 A1* | 5/2015 | Chevalier | G06Q 10/00 705/319 |
| 2016/0170993 A1* | 6/2016 | Katz | G06F 16/9535 707/727 |
| 2017/0220578 A1* | 8/2017 | Kazi | G06F 16/9535 |
| 2017/0344224 A1* | 11/2017 | Kay | G06F 3/04817 |
| 2018/0024991 A1* | 1/2018 | Baldwin | G06F 17/2785 704/9 |

* cited by examiner

REAL-TIME CLASSIFICATION OF EVOLVING DICTIONARIES

BACKGROUND

Field

The present disclosure generally relates to classifying information in social media. More specifically, the present disclosure relates to identifying new words, phrases, and characters associated to emerging social emotions and attitudes in social media.

Description of the Related Art

Current social network analytics engines constantly monitor network traffic to identify emerging trends in social media. Commonly used monitoring techniques involve neural network and machine learning tools operating on natural language input. However, natural language processing tools are typically slow to catch emerging trends in social media, at least compared to the speed at which the trends become waves and major social phenomena. Indeed, the emergence of characters, expressions, and symbols (e.g., emoji's) that have a precise meaning and can be texted quickly by users have made natural language tools less effective in identifying a trend, when it occurs. Conventional sentiment analysis is only about 70% accurate due to the lack of accuracy to catch the value of newly coined specific words and expressions (e.g., acronyms).

SUMMARY

In one embodiment of the present disclosure, a computer-implemented method is described. The computer-implemented method includes identifying an emotion identifier from a network message using an emotion identifier table and separating the emotion identifier from the network message, and splitting a remaining portion of the network message into multiple tokens, each of the multiple tokens delimited by a space or a punctuation mark. The computer-implemented method also includes determining a message sentiment score for the network message based on an emotion identifier sentiment score associated with the emotion identifier in the emotion identifier table, and on at least one of the multiple tokens, and adding a first token from the multiple tokens to the emotion identifier table based on a contribution from the first token to the message sentiment score. The computer-implemented method also includes associating a sentiment score for the first token in the emotion identifier table based on the contribution of the first token to the message sentiment score, and modifying an emotion identifier sentiment score of the first token when the first token is already included in the emotion identifier table based on the contribution of the first token to the message sentiment score.

According to one embodiment, a system is described that includes one or more processors and a memory coupled to the one or more processors, the memory including instructions that, when executed by the one or more processors, cause the one or more processors to identify an emotion identifier from a network message using an emotion identifier table. The one or more processors also execute instructions to separate the emotion identifier from the network message, and splitting a remaining portion of the network message into multiple tokens, each of the multiple tokens delimited by a space or a punctuation mark, and to determine a message sentiment score for the network message based on an emotion identifier sentiment score associated with the emotion identifier in the emotion identifier table, and on at least one of the multiple tokens. The one or more processors also execute instructions to add a first token from the multiple tokens to the emotion identifier table based on a contribution from the first token to the message sentiment score, to associate a sentiment score for the first token in the emotion identifier table based on the contribution of the first token to the message sentiment score, and to modify an emotion identifier sentiment score of the first token when the first token is already included in the emotion identifier table based on the contribution of the first token to the message sentiment score.

According to one embodiment, a non-transitory, machine readable medium is described that includes instructions, which when executed by one or more processors, cause a computer to perform a method. The method includes identifying an emotion identifier from a network message using an emotion identifier table and separating the emotion identifier from the network message, and splitting a remaining portion of the network message into multiple tokens, each of the multiple tokens delimited by a space or a punctuation mark. The method also includes determining a message sentiment score for the network message based on an emotion identifier sentiment score associated with the emotion identifier in the emotion identifier table, and on at least one of the multiple tokens, and adding a first token from the multiple tokens to the emotion identifier table based on a contribution from the first token to the message sentiment score. The method also includes associating a sentiment score for the first token in the emotion identifier table based on the contribution of the first token to the message sentiment score, and modifying an emotion identifier sentiment score of the first token when the first token is already included in the emotion identifier table based on the contribution of the first token to the message sentiment score.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
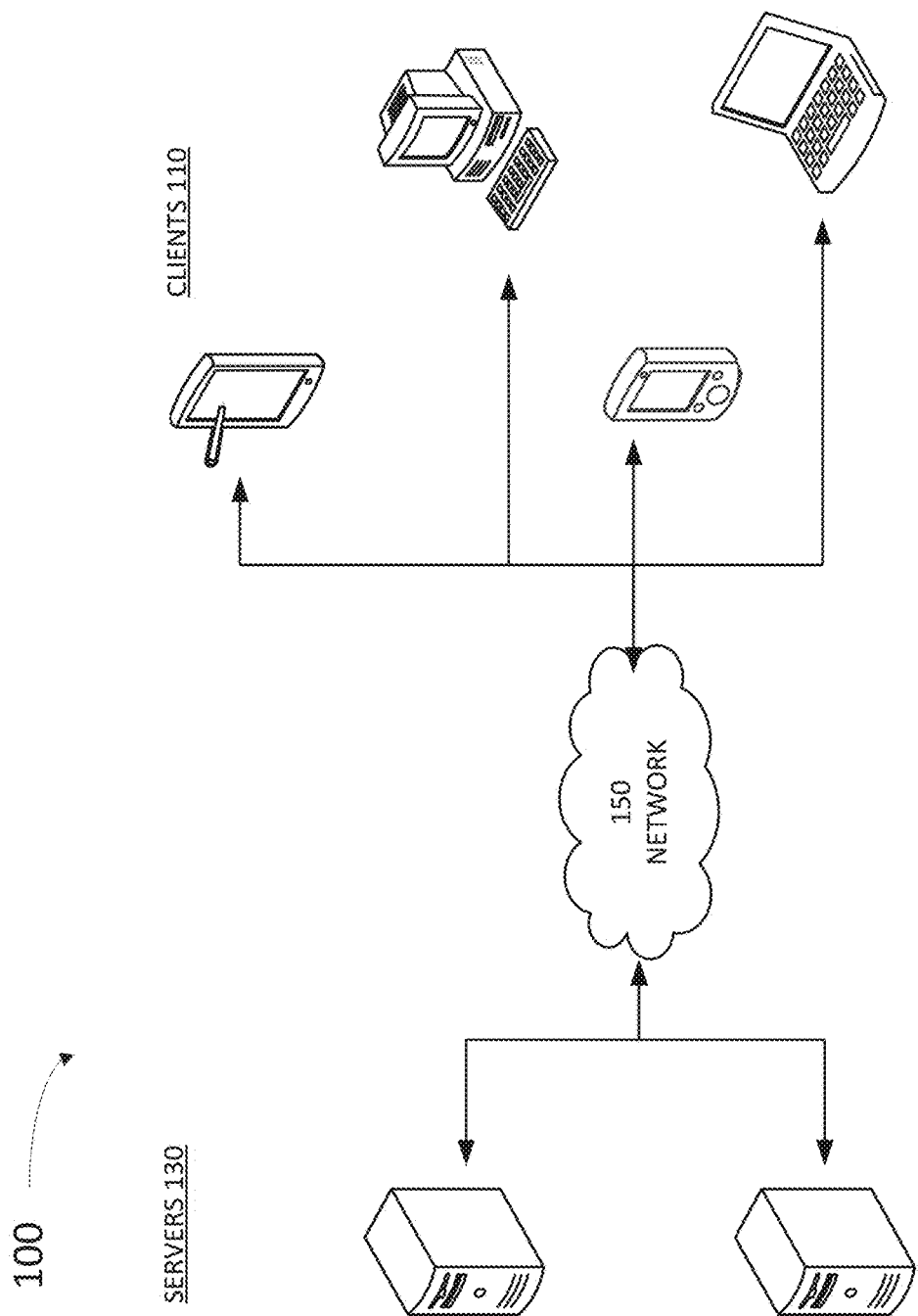
FIG. 1 illustrates an example architecture suitable for training and use of a real-time dictionary engine, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In social media, new language regularly emerges in the form of "netspeak" and new "memes." This represents a challenge for conventional, dictionary-based approaches to data classification. Indeed, most of the new words bear little or minimal resemblance to older content, while having significant implications to consumer sentiment and classification efforts.

Embodiments as disclosed herein solve this problem with a dictionary engine that creates, updates, and engrosses an ever-evolving dictionary (e.g., an emotion identifier table). In some embodiments, the dictionary engine supports forward (e.g., new emotions added to the table) and backward propagation (e.g., new interpretations of existing emotions in the table) of new information flexibly and naturally. In some embodiments, a dictionary engine as disclosed herein builds an awareness of language without any preconceived notions or manual coding of words, by having access to and leveraging other aspects of social media.

In some embodiments, the dictionary engine performs a multi-pass (e.g., backwards and forward) approach to words, characters, phrases, and sentiments in the emotion identifier table. In some embodiments, a dictionary engine may build an emotion identifier table of common, language-agnostic emotion identifiers. Initially, the emotion identifier table may include basic "netspeak" words, conventional emoticons (e.g., (:) :'(:-\)), unicode emoji, and more complex linear emoji ("Kaomoji"). The initial emotion identifier table may not be comprehensive. In some embodiments, the initial emotion identifier table is merely a starting point to identify emotions from which deeper insights may be gleaned after multiple iterations of the dictionary engine.

Embodiments as disclosed herein enable to identify emerging attitudes, emotions, and cultural responses, and use well known language identifiers and characters or symbols, such as emojis, catch phrases, or textual combinations of characters (e.g., 'lol,' 'hahaha,' 'hehehe,' 'lmao,' and the like). Embodiments as disclosed herein leverage the time it takes for new combinations of characters to "take on" (e.g., be used by a statistically significant population sample with a non-negligible frequency) and be identified. In some embodiments, a dictionary engine as disclosed herein is able to identify new emotions almost in real-time.

In addition, embodiments as disclosed herein are capable to ascribe deeper meaning and more sophisticated content to identified emotions or words, whether they are newly added to the lexicon of social networking or not. For example, certain words, phrases, or collection of characters may change their meaning over the course of time, or after some event. Accordingly, a dictionary engine as disclosed herein is able to adjust the semantic content of characters, words, phrases, emotions, and the like, based on current data trends. To achieve this, dictionary engines as disclosed herein are able to aggregate and process data and create highly accurate correlations to determine the content and meaning to the newly emerging word, character, or phrase and apply the determined 'translation' with confidence to analyze data traffic.

The disclosed system addresses the problem of accurately interpreting continuously evolving text, phrases, words, and the like, emerging in highly sophisticated social network schemes, which is a problem specifically arising in the realm of computer technology. The disclosed system provides a solution also rooted in computer technology, namely by accessing at least a portion of the network traffic and applying neural network and machine learning algorithms to tokenized text and characters found in messages, to match and update a continuously evolving emotion identifier table.

The proposed solution further provides improvements to the functioning of the computer itself because it saves computer usage and computational time to parse through massive loads of network traffic to identify consumer sentiment about a product and the like (e.g., substantially reducing debugging time for software developers, advertisers, marketing strategists, and the like). In that regard, some embodiments consistent with the present disclosure may be applied to accurately evaluate a brand, a product, an idea, or a service, by measuring consumer sentiment for a word, character, or phrase in the specific context of the brand, product, idea, or service. Further, sentiment scores based on a dynamic dictionary can be adjusted in real time as a social network captures the emergence of certain new words, new phrases, new sets of symbols, and the like.

Although many examples provided herein describe a user's communications and messages being identifiable, or detection of user to electronic device interaction history, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture 100 for training and use of a real-time dictionary engine, according to some embodiments. Architecture 100 includes servers 130 and clients 110 connected over a network 150. One of the many servers 130 is configured to host a memory including instructions which, when executed by a processor, cause the server 130 to perform at least some of the steps in methods as disclosed herein. In some embodiments, the processor is configured to tag selected activity in client device 110 and retrieve a timestamp from it. Accordingly, server 130 may evaluate the tagged activity and determine a level of acuity of the user of client device 110. For purposes of load balancing, multiple servers 130 can host memories, including instructions to one or more processors, and multiple servers 130 can host the collection of images.

Servers 130 may include any device having an appropriate processor, memory, and communications capability for hosting a dictionary engine that may collect acuity data from a user and perform a statistical analysis on the acuity data. Server 130 may then store the statistical analysis in a database within the server or accessible to server 130 through network 150. In some embodiments, server 130 uses information from the database to perform the statistical analysis and other processing of the acuity data (e.g., user interaction history from the instant user, or from multiple users). The dictionary engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the dictionary engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example System

Figure 2:
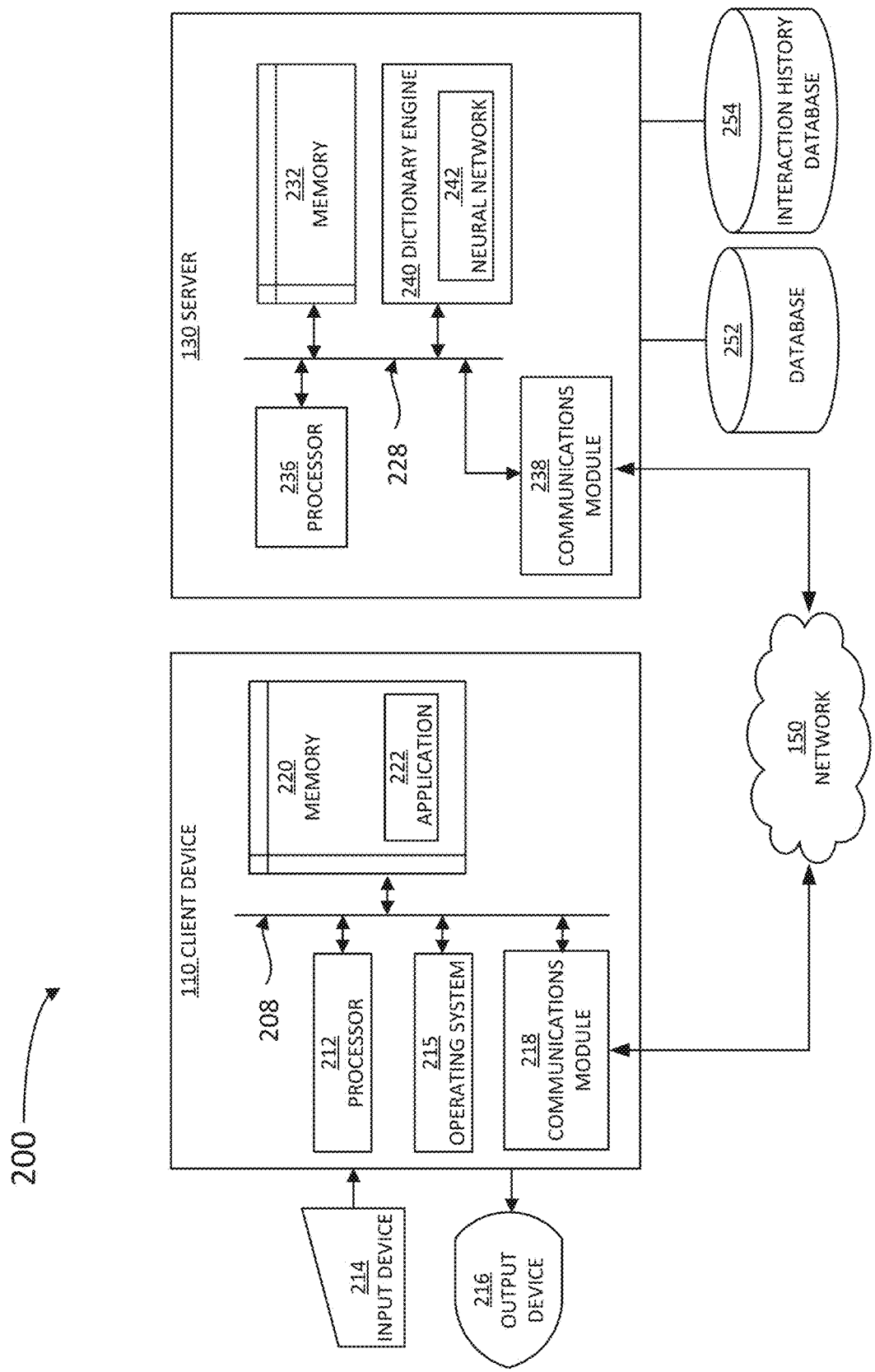
FIG. 2 is a block diagram illustrating an example server and a client device from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Client device 110 includes a processor 212, an operating system (OS) 215, a communications module 218, and a memory 220, all communicatively coupled with each other through a bus line 208. Memory 220 may include several applications installed in client device 110, such as an application 222. Client device 110 may also include or be communicatively coupled with an input device 214 and an output device 216. Input device 214 may include a keyboard or a touchscreen (in which case input device 214 and output device 216 may be part of the same device), a mouse, a pointer, and the like. Embodiments as disclosed herein include determining a change in mental acuity of a user accessing client device 110 through input device 214, based on the speed between strokes on a keyboard, taps on a touch screen, movements of a mouse, and other input actions that are timestamped and recorded by application 222. In some embodiments, application 222 is provided by a social network host (e.g., the DECAHOSE host by Twitter) that could be server 130 or a different server communicatively coupled with server 130. Accordingly, application 222 may provide server 130 with access to selected data streams exchanged between client device 110 and a social network. For example, in some embodiments, application 222 may provide about 10% or more of the data stream between client device 110 and a social network.

Server 130 includes a memory 232, a processor 236, and a communications module 238. Server 130 also includes a dictionary engine 240. In some embodiments, memory 232, processor 236, communications module 238, and dictionary engine 240 are communicatively coupled through a bus 228. Processor 236 is configured to interact with, and execute instructions from, dictionary engine 240. Dictionary engine 240 may execute commands stored in memory 232, and retrieve/store data from and to memory 232. In some embodiments, at least some of the commands executed by dictionary engine 240 may be part of a neural network 242. Neural network 242 may include instructions and commands associated with any machine learning algorithm, such as a genetic convolutional neural network, a training based classification network.

Server 130 also includes, or may be coupled with, a database 252, and an interaction history database 254. In one or more implementations, database 252 represents a database that contains data units and associated information regarding the data units, such as statistical analysis and location information for the data unit within a document. In some embodiments, processor 236 includes parallel processing capabilities, such as may be found in graphics processing units (GPUs) and the like. In some embodiments, processor 236 may be enhanced with GPU cards for processing more operations in parallel, and the generated workload can be optimally distributed across multiple different physical computers and servers 130.

In some embodiments, database 252 and interaction history database 254 may be external to server 130, for example, and can be hosted in a memory of a different server, but accessible by server 130. For example, in some embodiments, database 252 and interaction history database 254 may be remotely accessible to server 130 through network 150. In some embodiments, database 252 and interaction history database 254 may be internal to server 130. Database 252 may include any one of a structured query language (SQL) database, a not-only-SQL (NoSQL) database, a MySQL database, and the like. Interaction history database 254 may include prior parsing results that dictionary engine 240 may use for further applications to shorten the processing. For example, when dictionary engine 240 is used for parsing text rich documents, access to results obtained from prior documents may be relevant for dictionary engine 240 to determine a frequency score for certain words in a sentence (e.g., in an English document). In some embodiments, when dictionary engine 240 is used to parse a genome to determine certain disease patterns and the like, dictionary engine 240 may use prior genomes stored in interaction history database 254 so as to strengthen the scoring capability for the frequency of newly introduced genomes. Server 130 may access application 222 in client device 110 through dictionary engine 240, or through a web browser installed in client device 110.

Processor 212 in client device 110 executes instructions stored in application 222 to perform a majority of control and timestamp routines consistent with methods disclosed herein. Client device 110 may include low-level system instrumentation such as device drivers (e.g., for a keyboard, a mouse, a touchscreen display, and the like), coupling to, or performing other interception strategies to monitor user actions in client device 110. This allows for accurate timestamp calculation between events. Further, in some embodiments, data aggregation and posterior analysis from the fine granular data collected by client device 110 may be performed by processor 236 executing instructions from dictionary engine 240, in server 130. User input events (e.g., "user activity") are packaged together and sent from client device 110 to server 130 for processing, display, and storage, using communications modules 218 and 238, via network 150. Server 130 receives the data via a POST request and stores it in database 252. In some embodiments, data pertaining to each user is stored separately to allow for individualized reports to be produced.

Figure 3:
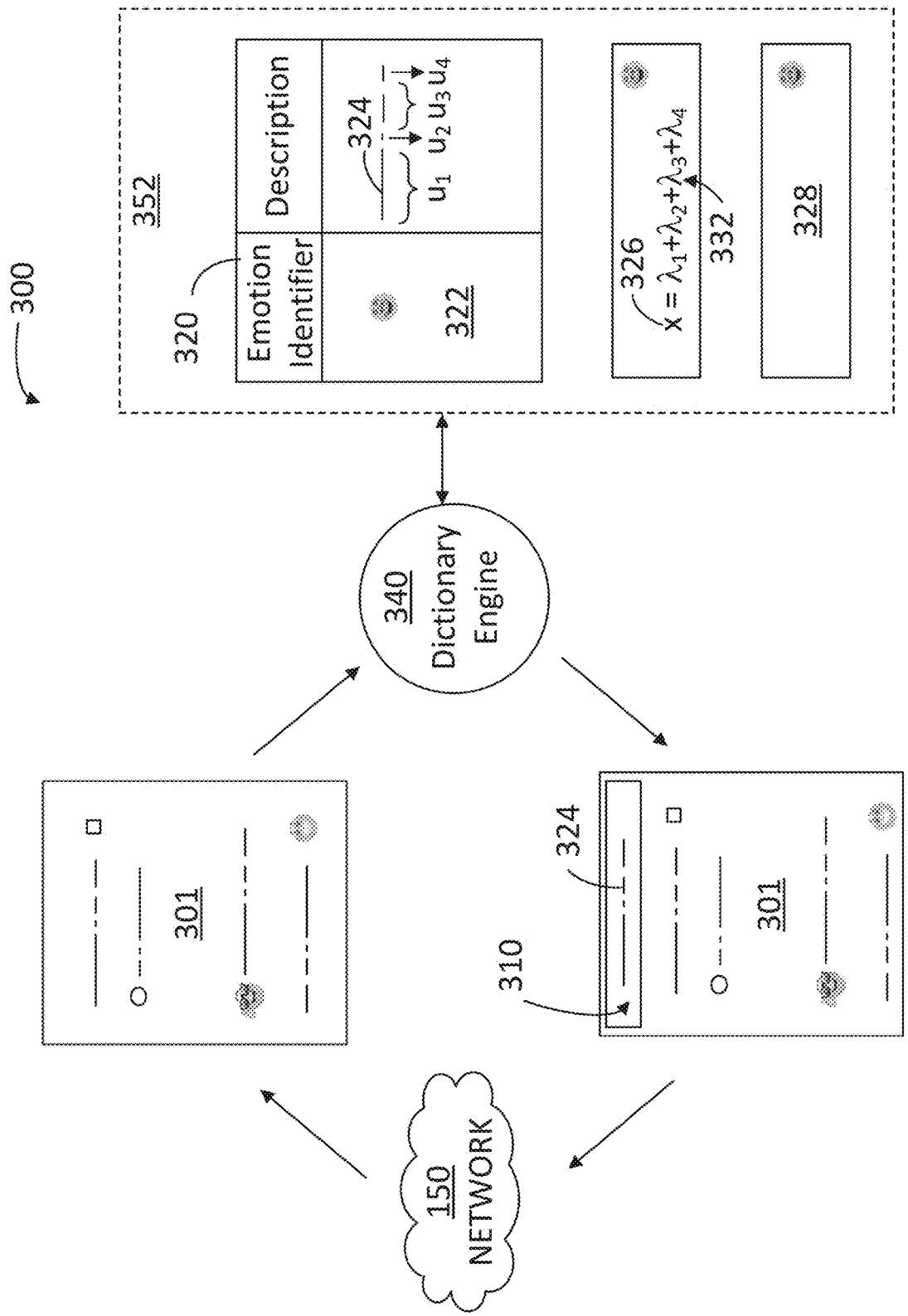
FIG. 3 is a block diagram illustrating an example operation of a dictionary engine that inserts an emotion description in a metadata portion of a message, according to some embodiments.

FIG. 3 is a block diagram illustrating an example operation 300 of a dictionary engine 340 that inserts an emotion description 324 in a metadata portion 310 of a message 301, according to some embodiments. An emotion identifier table 320 is dynamically updated according to new messages 301 received from network 150 through network traffic. In some embodiments, emotion identifier table 320 is stored in a memory 352 that may be part of the server that hosts dictionary engine 340, or may be located in a remote database that is accessible to dictionary engine 340 (e.g., server 130, memory 232, and database 254).

Emotion identifier table 320 may include an emoji as an emotion identifier 322, as well as an associated description 324. Description 324 may include a set of words describing the emotion expressed by the emoji, allowing the emoji to be more broadly applicable to messages that may not include the specific emoji, but may contain similar text as description 324. In some embodiments, dictionary engine 340 collects multiple messages 301 from network 150, and uses the text and characters therein to train neural network 242 to include new emotion identifiers in emotion identifier table 320.

In some embodiments, an emotion identifier 322 is stored as a string of Unicode Transform Format (UTF-8) characters. In some embodiments, multiple emotion identifiers 322 are stored in a tree form in memory 352, with each character branching off to multiple child characters. This allows a large list of emotion identifiers to be compared against a given string of message text in a single pass of dictionary engine 340 over the message text.

Some embodiments of emotion identifier table 320 include a scale value 326 (x) associated with an emotion identifier 322 is a weight value assigned according to a sum of weights 332 ($\lambda_1, \lambda_2, \lambda_3, \lambda_4$) associated with each of the words $u_1, u_2, u_3$, and $u_4$ in the description 324 of emotion 322. In some embodiments, x 326 may be assigned a positive, a negative, or a neutral (e.g., zero) value. Some embodiments may include scale values addressing deeper subtleties in language, such as 'sadness' ($\lambda_1$) vs 'anger' ($\lambda_2$) vs 'frustration' ($\lambda_3$). Such subtle meanings may be provided by weights 332. In some embodiments, weights 332 may be obtained from an algorithm (e.g., neural network 242) that associates emotion identifier 322 with description 324. For example, in some embodiments, weights 332 may be neural network coefficients indicating the impact of each of words 324 ($u_i$) into emotion identifier 322, e.g., whether the word $u_i$ is 'deterministic' ('+1'), 'non-deterministic' ('0'), or antipodal ('−1') to emotion 322, or how deterministic it is. Words $u_i$ in emotion description 324 may be generally described as tokenized text.

As a result, for each emotion identifier 322, emotion identifier table 320 lists groups of four, three, two, or fewer words and phrases (e.g., $u_1, u_2, u_3$, and $u_4$) associated with a nucleus of emotion or expression invoked by emotion identifier 322. In some embodiments, dictionary engine 340 may take into account a selected geographic area to collect data for emotion identifiers 322 that are characteristic of certain cultures or regions. For example, the use of emojis may vary substantially in different regions of the world. Out of thousands (ca., 2000 or more) of recognized emojis (Unicode consortium), only a few hundred (ca. 200) are frequently used in the US.

In some embodiments, dictionary engine 340 maintains a frequency counter 328 associated with each of emotion identifiers 322. Frequency counter 328 may be a number between '0' and '1,' indicating the probability of finding a specific emotion identifier 322 in a message. Accordingly, frequency counter 328 may be updated after a selected time window, aggregating data over multiple messages from multiple different users in different geographic areas. Dictionary engine 340 may then be configured to detect fluctuations in frequency counter 328 using moving averages, predictors, and related algorithms (e.g., Kalman filtering and the like). When a frequency counter 328 has a value at least one standard deviation above (or below) the mean, dictionary engine 340 may identify a trending pattern during the selected time window, e.g., emotion identifier appears on one thousand messages within 1 hour or so. Further, in some embodiments, the time window may be dynamically adjusted according to network traffic, the value of scale factor 326, or the value of frequency factor 328 (e.g., when scale factor 326 or frequency factor 328 starts increasing, dictionary engine 340 may reduce the time window to enhance accuracy and precision).

When extracted, each emotion description 324 is stored in metadata portion 310 of message 301. In some embodiments, dictionary engine 340 may also include scale factor 326 and frequency counter 328 for emotion identifier 322 in metadata portion 310.

When a message contains an entirely new word (e.g., "covfefe"), dictionary engine 340 may identify no sentiment associated with that word (e.g., x=0). However, in some embodiments, dictionary engine 340 may use the other words within a message to ascribe a sentiment for the new word (e.g., words and characters in description 324). As more messages are received which repeat the same word (e.g., "covfefe"), description 324 may be continually adjusted to represent the blended opinion across all of the messages.

Figure 4:
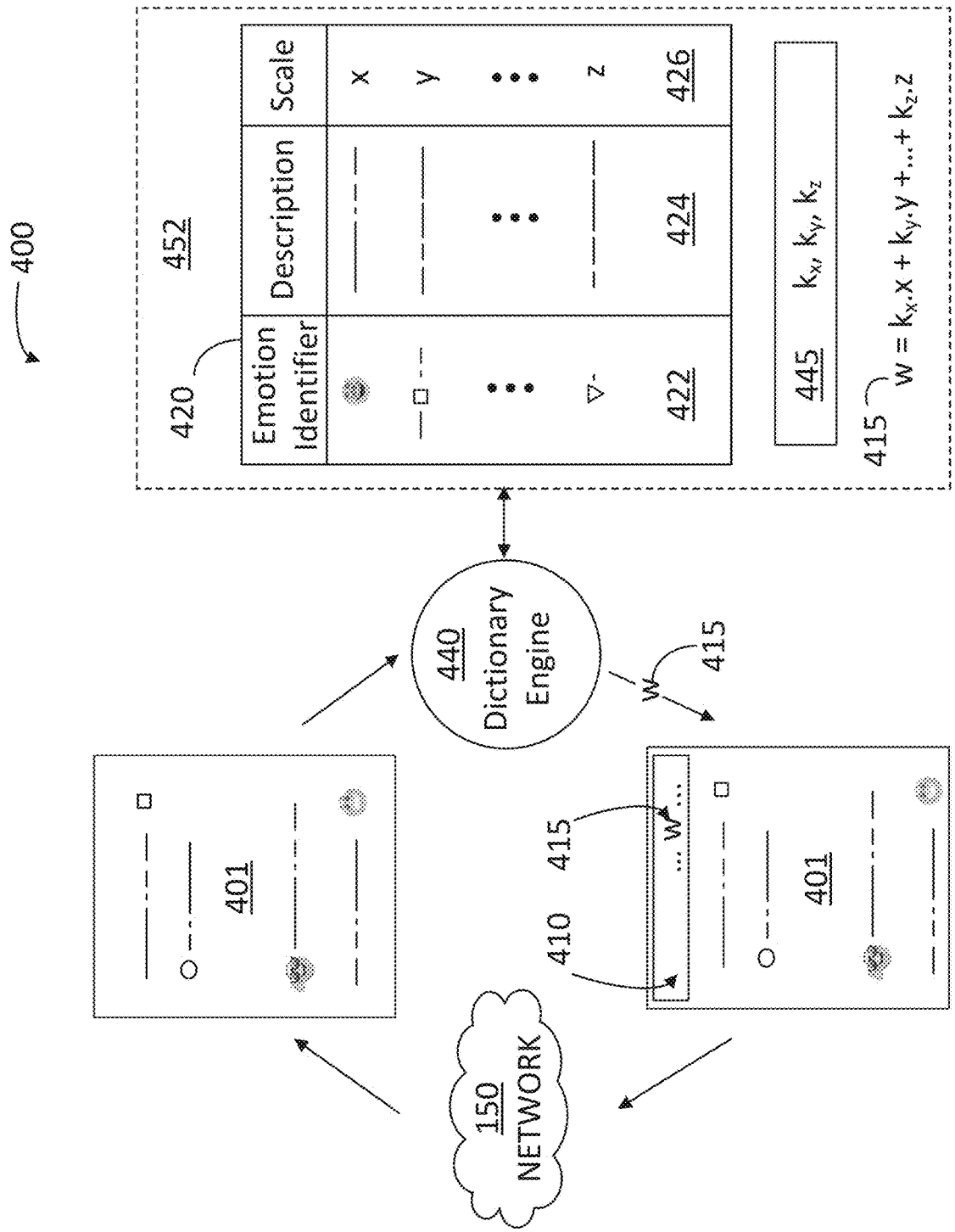
FIG. 4 is a block diagram illustrating an example message classification according to an emotional scale by a dictionary engine, according to some embodiments.

FIG. 4 is a block diagram illustrating an example message classification 400 according to an emotional scale by a dictionary engine 440, according to some embodiments. An emotion identifier table 420 is dynamically updated according to new messages 401, received from network 150 through network traffic. In some embodiments, emotion identifier table 420 is stored in a memory 452 that may be part of the server that hosts dictionary engine 440, or may be located in a remote database that is accessible to dictionary engine 440 (e.g., memory 232, database 254). Emotion identifier table 420 lists emotion identifiers 422, a text description 424 of each emotion identifier 422, and a scale value 426 (e.g., x, y, . . . , z) for each of the emotion identifiers. Emotion identifier table 420 may be adjusted in time; specifically, the weight values 426 in the scale may be constantly adjusted as new content or significance may be added to emotion identifier 422 in the network traffic.

In some embodiments, neural network 242 in dictionary engine 440 produces a set of weight factors 445 ($k_x$, $k_y$, and $k_z$). Weight factors 445 can be selected as the components of a resultant feature vector in a neural network computation, having as input the tokenized components of message 401, as provided in textual description 424 (cf. description 324). The resultant feature vector has an entry for each token, the entry indicating the contribution of each token to the overall evaluation 415 ('w') of the message. The value w 415 may be any real number between −1 and 1, wherein negative values indicate a negative sentiment, a positive value indicates a positive sentiment, and zero indicates a message indifference to the emotion expressed in emotion identifier 422. In some embodiments, overall evaluation, w 415 may be obtained from the following mathematical expression:

$$W = k_x \cdot x + k_y \cdot y + \ldots + k_z \cdot z \qquad (1)$$

Dictionary engine 440 may include w 415 in the meta-data portion 410 of message 401. Accordingly, overall weight factor 415 ('w') can be a classifier for message 401 (e.g., degree of laudatory remarks about subject 'A' on account of event 'B'), which may be used as an input for training of neural network 242. Therefore, further use of neural network 242 provides new values w 415 to old messages, and also new scale factors x, y, z to each of the words and emotion identifiers 422. This self-adjustment enables dictionary engine 440 to adapt quickly to emerging trends in the network traffic.

Over the course of multiple iterations (hundreds, thousands, or more, depending on the size of the network sample, the extent of the time window studied, and the size of the geographic area selected), emotion identifier table 420 will be able to classify new messages to a significant level of confidence as the majority of deterministic words will be classified. As new messages 401 continue to arrive, fewer new words and emotion identifiers may need to be classified because a pre-existing context may be found within emotion identifier table 420. Accordingly, the sentiment associated to an emotion identifier 422 in each new message may alter the sentiment associated to the same emotion identifier 422 in previously stored messages. Thus, changes in sentiments and perception or context of words, phrases, and other emotion identifiers may be accurately adjusted over time.

When a previously known deterministic word is found in a new message 401, the description 424 accompanying it in the new message may modify the existing score (cf. score 326). This real-time, self-adjustment of dictionary engine 440 avoids the pitfalls of manually created databases and lexicons (the conventional approach) where words that seem important, end up negatively impacting the stability of the scoring (e.g., the word "work" could be manually classified as negative by people who hold negative connotations to working but this misses cases like "the product works").

In some embodiments, the content and type of messages 401 may be selected based on certain applications. For example, an organization (e.g., a political party, a company, or a consortium) may wish to identify the emotion expressed by potential voters or customers interacting with the organization on social media. They've tried existing sentiment analysis tools but have found that they are not suited to keeping up with the fast pace of social media. They apply dictionary engine 440 to a social media feed of the organization after pre-training neural network 242 on a large existing corpus of historical messages. The organization may receive updated views of consumer sentiment associated with emotion identifiers that define the nature and purpose of the organization as messages are posted in the social network. A new set of phrases emerges from a meme that was created pertaining to their brand. The system identifies the new phrases and automatically classifies them, returning accurate sentiment for each message, including sentiment for messages which include previously unknown phrases. Dictionary engine 440 may be configured to identify customers interacting with the social network positively or negatively. With this information, the organization may develop strategies to improve its public outlook and prospects.

Figure 5:
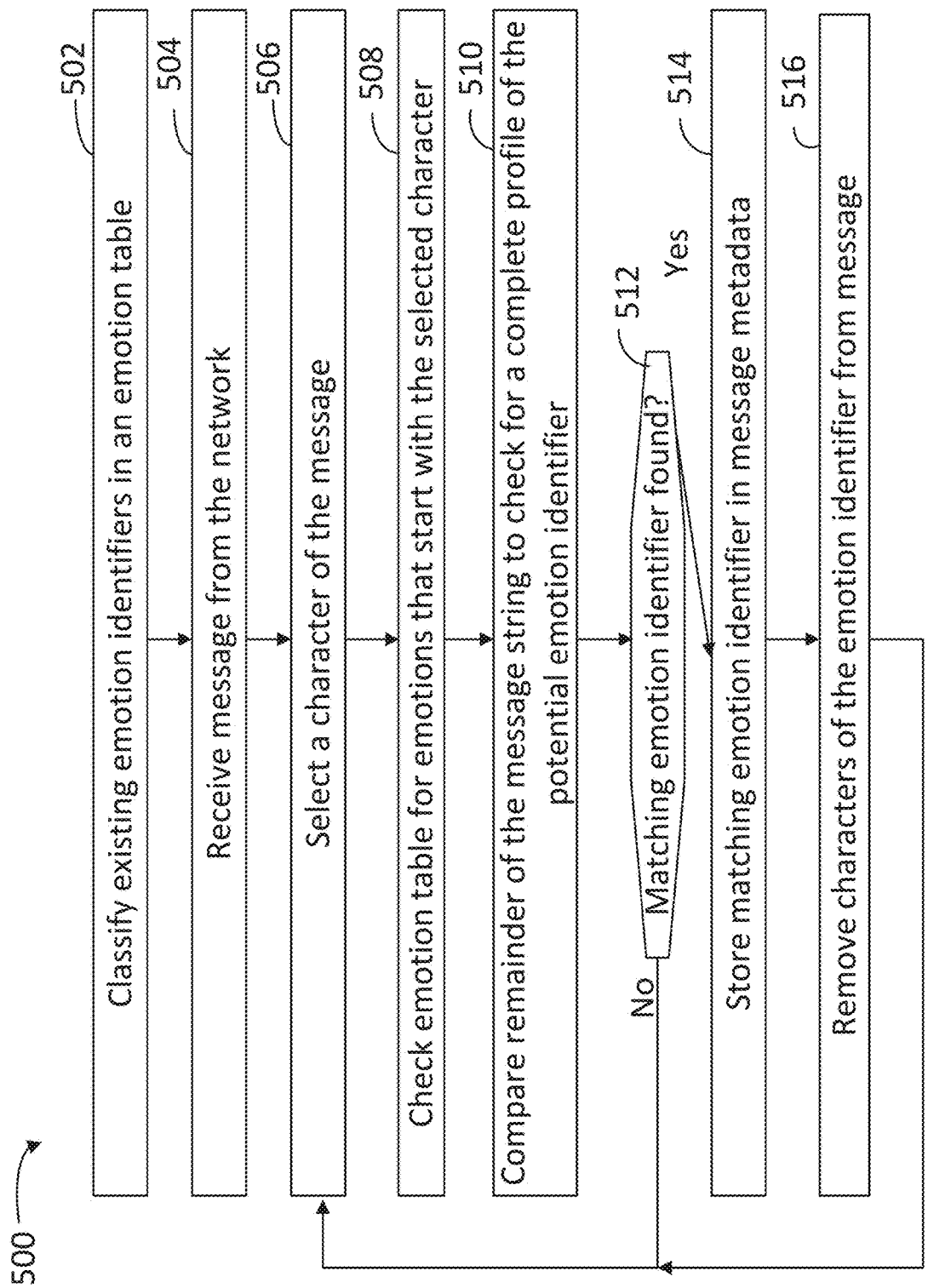
FIG. 5 is a block diagram illustrating steps in a method to use a real-time dictionary engine to associate an emotion to a message, according to some embodiments.

FIG. 5 is a block diagram illustrating steps in a method 500 to use a real-time dictionary engine to associate an emotion to a message, according to some embodiments. In some embodiments, at least some of the steps in method 500 may be performed by a computer such as a client device or a server, the computer including a memory storing instructions and at least one processor configured to execute the instructions to perform at least one step in method 500 (e.g., client device 110, server 130, processors 212 and 236, and memories 220 and 232). In some embodiments, the client device may be configured to execute an application running commands and instructions provided by the server (e.g., application 222), or any other remote server coupled to the client device. The application may be associated with a social network site, involving multi-partite communication and data exchange between registered users, with data and meta-data associated with the content and exchange of such communications being stored in a database or in an interaction history database (e.g., database 252 and interaction history database 254). Further, in some embodiments, the server may allow a third party access to at least a portion of the data and meta-data stored in the database or the interaction history database, to perform steps consistent with at least one or more of the steps in method 500. In some embodiments, the server may perform one or more of the steps in method 500 using a dictionary engine including a neural network (e.g., dictionary engine 240 and neural network 242).

Step 502 includes classifying existing emotion identifiers in an emotion table. In some embodiments, step 502 may include classifying emojis and other well-known emotion identifiers in the emotion table. In some embodiments, step 502 includes preparing an initial set of emotion identifiers (e.g., including several hundreds, or maybe less) from existing or well-known emojis and other expressions in netspeak. Further, in some embodiments, step 502 may include adding a description based on the emotion invoked by each emotion identifier (e.g., description 324).

Step 504 includes receiving a message from the network. In some embodiments, step 504 may include accessing a pipeline carrying network traffic associated with a social network, and retrieving a portion of the network traffic.

Step 506 includes selecting a character from the message.

Step 508 includes checking the emotion table for emotions that start with the selected character.

Step 510 includes comparing the remaining characters in the emotion identifier string to complete the profile of the potential emotion identifier.

Step 512 includes verifying whether a matching emotion identifier is found in the message string. When a matching emotion identifier has not been found, according to step 512, method 500 continues from step 506 onwards. When an emotion identifier has been found in step 512, step 514 includes storing the matching emotion identifier in the message metadata.

Step 516 includes removing the characters of the emotion identifier from the message, after which method 500 continues from step 506 onwards. Accordingly, step 516 guarantees that a different emotion identifier is matched in a second, third, or further iteration of method 500.

Figure 6:
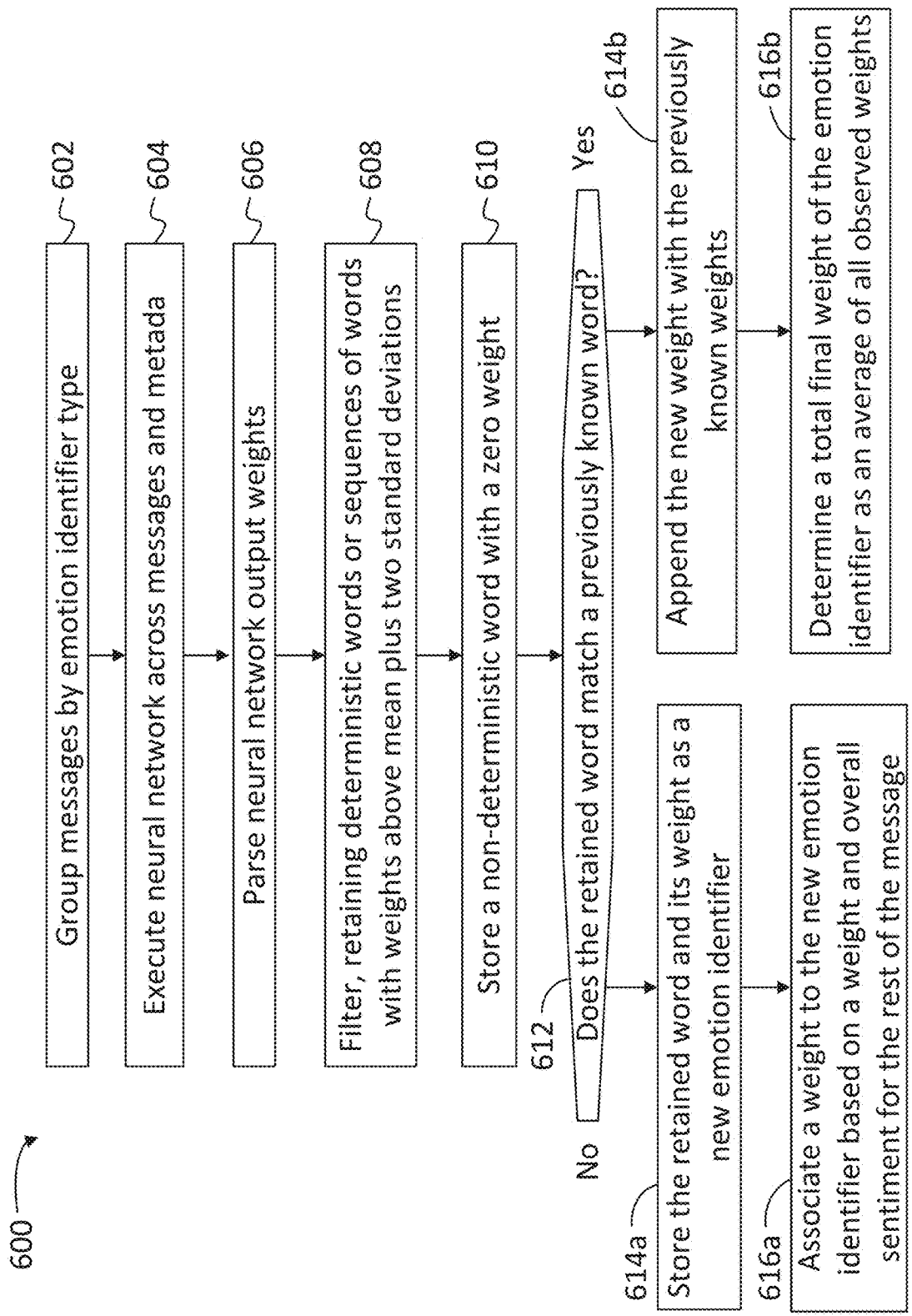
FIG. 6 is a block diagram illustrating steps in a method to train a real-time dictionary engine to identify emotions from words in a message, according to some embodiments.

FIG. 6 is a block diagram illustrating steps in a method to train a real-time dictionary engine to identify emotions from words in a message, according to some embodiments. In some embodiments, at least some of the steps in method 600 may be performed by a computer such as a client device or a server, the computer including a memory storing instructions and at least one processor configured to execute the instructions to perform at least one step in method 600 (e.g., client device 110, server 130, processors 212 and 236, and memories 220 and 232). In some embodiments, the client device may be configured to execute an application running commands and instructions provided by the server (e.g., application 222), or any other remote server coupled to the client device. The application may be associated with a social network site, involving multi-partite communication and data exchange between registered users, with data and meta-data associated with the content and exchange of such communications being stored in a database or in an interaction history database (e.g., database 252 and interaction history database 254). Further, in some embodiments, the server may allow a third party access to at least a portion of the data and meta-data stored in the database or the interaction history database, to perform steps consistent with at least one or more of the steps in method 600. In some embodiments, the server may perform one or more of the steps in method 600 using a dictionary engine including a neural network (e.g., dictionary engine 240 and neural network 242).

Step 602 includes grouping messages by emotion identifier type. In some embodiments, step 602 includes splitting a large set of messages between positive and negative sentiment groups. In some embodiments, step 602 may include splitting the received messages into more complex groups pertaining to subtleties in emotion (joy, sadness, anger, anticipation, etc.).

Step 604 includes executing the neural network across messages and metadata. The neural network is given each group of text separately and is trained with each set versus each other set (e.g., based on their emotion identifiers, training the "positive" text to be identified in one group and to not match any in the "negative" group).

Step 606 includes parsing the neural network output weights. In some embodiments, step 606 includes inspecting the output of the neural network to find words or sequences of words that contribute most significantly to the overall sentiment of the message (e.g., the emotion identifiers associated with the largest k values, cf. FIG. 4). When the neural network training is complete, the resultant feature vectors indicate what words or emotion identifiers contribute most significantly to a message being either positive or negative. These words or emotion identifiers are then included in the emotion identifier table (e.g., emotion identifier tables 320 or 420), which may also include more obvious emotion from emotion identifiers like emoji, and translating them into what words are related to these emoji.

Step 608 includes filtering the message while retaining deterministic words or sequences of words (according to the neural network output weights). In some embodiments, step 608 includes selecting a deterministic word as one that has a scale factor, x, (e.g., scale factor 326) one or two standard deviations above a mean value. In some embodiments, the mean value is determined over all the words encountered within a selected time window.

Step 610 includes storing a non-deterministic word with a zero weight.

Step 612 includes verifying whether the retained word matches a previously known word in the dictionary. When the retained word or emotion identifier does not match a previously known word according to step 612, step 614a includes storing the retained word in the dictionary, together with its associated weight, as a new emotion identifier. If the deterministic words or emotion identifiers were not known before, they are inserted as new words or new emotion identifiers, storing the weight and the occurrences as "one."

Step 616a includes associating a weight to the new emotion identifier based on a weight and overall sentiment for the rest of the message. When the retained word matches a previously known word in step 612, step 614b includes appending the new weight with the previously known weights for the word. In some embodiments, the new weight is a floating point number representing the significance of the contribution of the word or emotion identifier to the overall sentiment, w, of the message and the direction (positive or negative, e.g., overall sentiment w 415).

Step 616b includes determining a total final weight of the emotion identifier as an average of all observed weights. To illustrate the overall sentiment associated with a given word in the emotion identifier list, the word "Isis" can be used as an example. Isis may have a previous sentiment weight value $x_1$ at a period of time or in the context of the Egyptian god of the sun, and Isis may have a different sentiment weight value $x_2$ in the recent 4-5 years as the acronym for a well-known terrorist organization. This weight may change to a third value $x_3$ after an event that prompts messages including phrases such as "we defeated Isis" or "after the disappearance of the terrorist group Isis."

Figure 7:
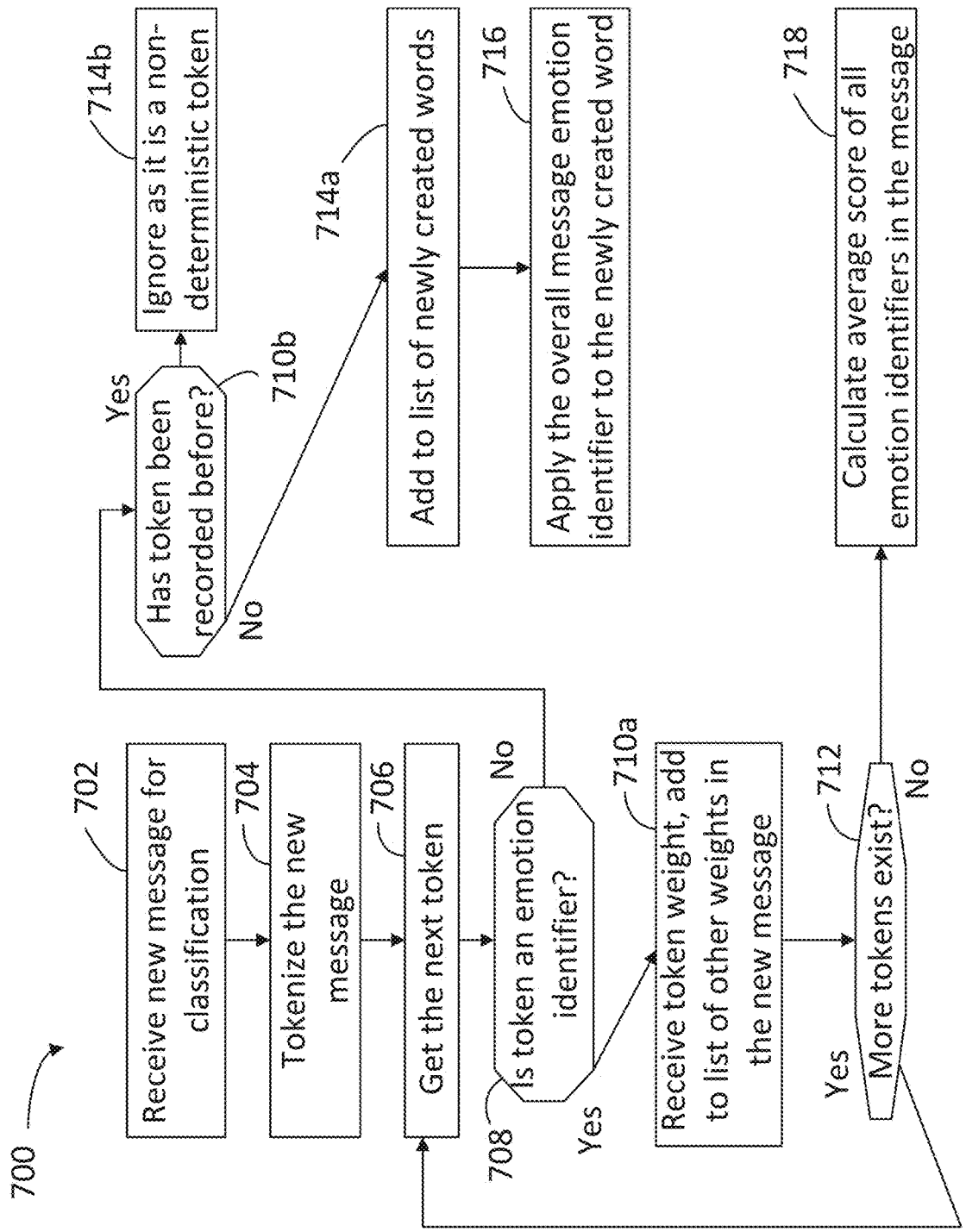
FIG. 7 is a block diagram illustrating steps in a method to build a dictionary with a real-time dictionary engine to classify a new message using emotion identifiers, according to some embodiments.

FIG. 7 is a block diagram illustrating steps in a method to build a dictionary with a real-time dictionary engine to incorporate tokens in a message as emotion identifiers, according to some embodiments. In some embodiments, at least some of the steps in method 700 may be performed by a computer such as a client device or a server, the computer including a memory storing instructions and at least one processor configured to execute the instructions to perform at least one step in method 700 (e.g., client device 110, server 130, processors 212 and 236, and memories 220 and 232). In some embodiments, the client device may be configured to execute an application running commands and instructions provided by the server (e.g., application 222), or any other remote server coupled to the client device. The application may be associated with a social network site, involving multi-partite communication and data exchange between registered users, with data and meta-data associated with the content and exchange of such communications being stored in a database or in an interaction history database (e.g., database 252 and interaction history database 254). Further, in some embodiments, the server may allow a third party access to at least a portion of the data and meta-data stored in the database or the interaction history database, to perform steps consistent with at least one or more of the steps in method 700. In some embodiments, the server may perform one or more of the steps in method 700 using a dictionary engine including a neural network (e.g., dictionary engine 240 and neural network 242).

Step 702 includes receiving a new message for classification. In some embodiments, step 702 may include tapping a pipeline that includes the network traffic of a social network server. Before being tokenized, the message is parsed to extract UTF-8 emotion identifiers. This ensures that more complex groups of UTF-8 strings are not broken if they'd normally be split (e.g., colons would normally be removed during string tokenization but need to be retained in the first pass so that ":)" can be parsed out accurately).

Step 704 includes tokenizing the new message. The message is then tokenized, splitting it into individual words based on spaces and punctuation.

Step 706 includes getting the next token in the message string.

Step 708 includes determining whether the token is an emotion identifier.

When the token is an emotion identifier as per step 708, step 710a includes receiving the token weight, and adding the weight to the list of other weights in the new message. Step 712 includes determining whether more tokens exist in the message; if so, method 700 is repeated from step 706. If no more tokes exist in the message, step 718 includes calculating an average score of all emotion identifiers in the message. As new messages come in, they are checked against the existing emotion identifier table to slightly adjust existing scoring if a significant sentiment change has occurred. For example, if a common word has more recently become associated with a negative action (i.e. "Isis," previously the sun god, now representing a terrorist group), the new messages will be able to impact the previous scores to change the sentiment over time.

When the token is not recognized as an emotion identifier in step 708, step 710b includes determining whether the token has been recorded before; if so, step 714b includes ignoring the token as it is a non-deterministic token. Once a sufficient number of messages have been classified (usually many thousands or millions), the majority of deterministic sentiment words will have been identified. New words will become increasingly scarce, eventually becoming non-existent once all words have been classified as positive/negative/neutral.

If the token has not been recorded before, step 714a includes adding the token to a list of newly created words. Step 716 includes applying the overall message emotion identifier to the newly created word.

Figure 8:
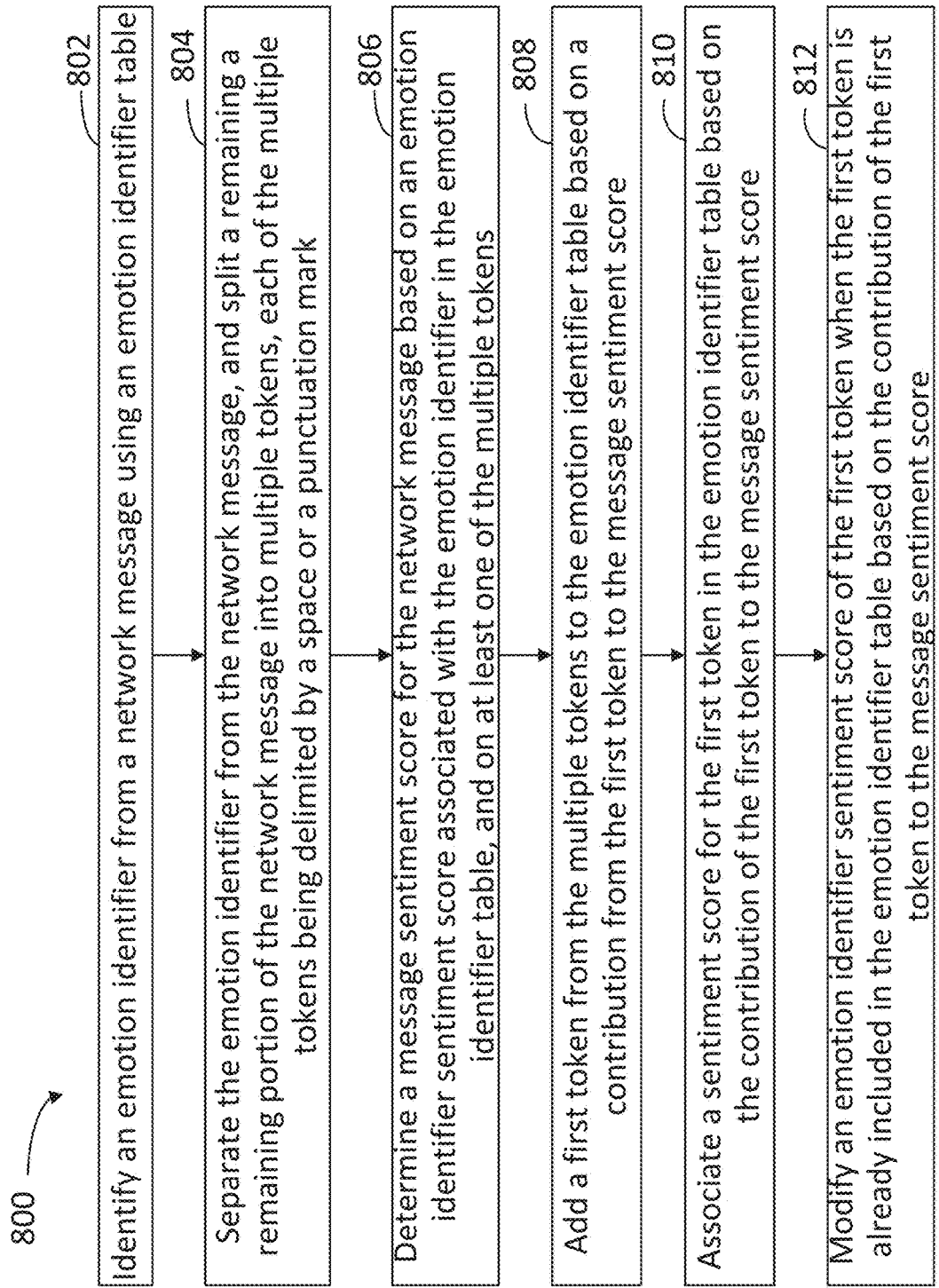
FIG. 8 is a block diagram illustrating steps in a method to use an emotion table to associate an emotion to a message, according to some embodiments.

FIG. 8 is a block diagram illustrating steps in a method 800 to use an emotion table to associate an emotion to a message, according to some embodiments. In some embodiments, at least some of the steps in method 800 may be performed by a computer such as a client device or a server, the computer including a memory storing instructions and at least one processor configured to execute the instructions to perform at least one step in method 800 (e.g., client device 110, server 130, processors 212 and 236, and memories 220 and 232). In some embodiments, the client device may be configured to execute an application running commands and instructions provided by the server (e.g., application 222), or any other remote server coupled to the client device. The application may be associated with a social network site, involving multi-partite communication and data exchange between registered users, with data and meta-data associated with the content and exchange of such communications being stored in a database or in an interaction history database (e.g., database 252 and interaction history database 254). Further, in some embodiments, the server may allow a third party access to at least a portion of the data and meta-data stored in the database or the interaction history database, to perform steps consistent with at least one or more of the steps in method 800. In some embodiments, the server may perform one or more of the steps in method 800 using a dictionary engine including a neural network (e.g., dictionary engine 240 and neural network 242).

Step 802 includes identifying an emotion identifier from a network message using an emotion identifier table. In some embodiments, step 802 includes retrieving the emotion identifier from a metadata portion of the network message. In some embodiments, step 802 includes matching a plurality of characters in the network message with an emotion identifier in the emotion identifier table, removing the plurality of characters from the network message when a matching emotion identifier is found, and matching a remaining character string in the network message with a second emotion identifier in the emotion identifier table.

Step 804 includes separating the emotion identifier from the network message, and splitting a remaining portion of the network message into multiple tokens, each of the multiple tokens delimited by a space or a punctuation mark.

Step 806 includes determining a message sentiment score for the network message based on an emotion identifier sentiment score associated with the emotion identifier in the emotion identifier table, and on at least one of the multiple tokens. In some embodiments, step 806 includes grouping the network message with a second network message in a classification group based on a second emotion identifier sentiment score associated with the second network message, and applying a machine learning algorithm to determine the overall sentiment score based on the classification group. In some embodiments, step 806 includes accessing a network server hosting a social network application, grouping the network message with multiple network messages from the network server to form a plurality of network messages, and applying a machine learning algorithm to the plurality of network messages. In some embodiments, step 806 includes grouping the network message with a plurality of network messages collected over a selected period of time. In some embodiments, step 806 includes grouping the network message with a plurality of network messages collected over a selected geographic area, the method further comprising associating the selected geographic area to the first token in the emotion identifier table. In some embodiments, step 806 includes grouping the network message with a plurality of network messages collected over a selected demographic group, the method further comprising associating the selected demographic group to the first token in the emotion identifier table.

Step 808 includes adding a first token from the multiple tokens to the emotion identifier table based on a contribution from the first token to the message sentiment score. In some embodiments, step 808 includes selecting the first token such that the contribution from the first token to the message sentiment score is at least two standard deviations above an average contribution of the multiple tokens to the message sentiment score.

Step 810 includes associating a sentiment score for the first token in the emotion identifier table based on the contribution of the first token to the message sentiment score.

Step 812 includes modifying an emotion identifier sentiment score of the first token when the first token is already included in the emotion identifier table based on the contribution of the first token to the message sentiment score. In some embodiments, step 812 includes associating a new emotion identifier sentiment score of the first token with an average of a previous emotion identifier sentiment score of the first token with the contribution of the first token to the message sentiment score.

Hardware Overview

Figure 9:
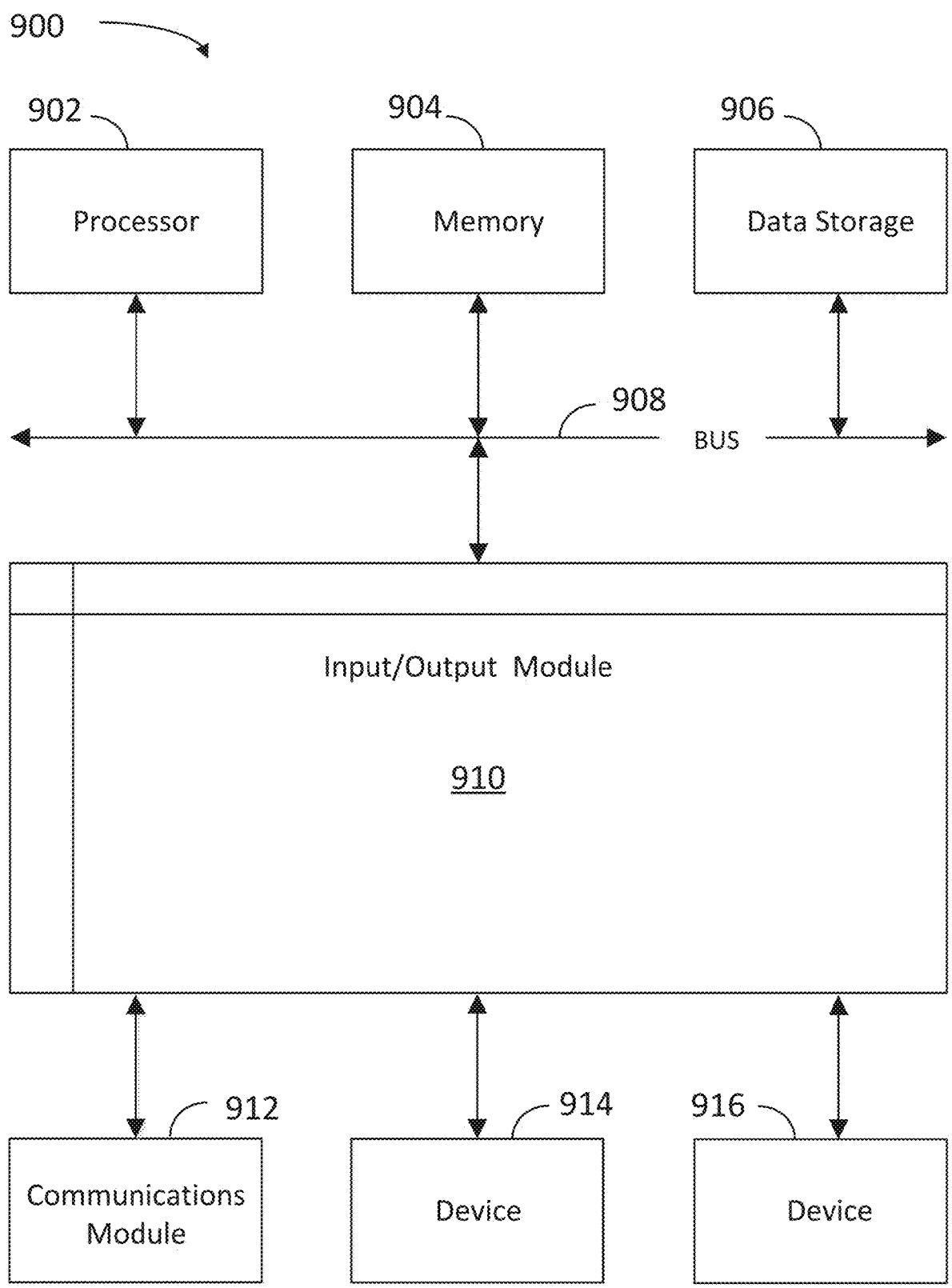
FIG. 9 is a block diagram illustrating an example computer system with which the client and server of FIGS. 1 and 2, and the methods of FIGS. 5-8 can be implemented, according to some embodiments.

FIG. 9 is a block diagram illustrating an exemplary computer system 900 with which the client 110 and server 130 of FIGS. 1 and 2, and the methods of FIGS. 5-7, can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, a code that creates an execution environment for the computer program in question, e.g., code that constitutes processor firmware, a protocol stack, a database management system, an operating system, or a combination of one or more of them stored in an included memory 904 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, a special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906, such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports, such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship with each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of X, Y, and Z" or "at least one of X, Y, or Z" each refer to only X, only Y, or only Z; any combination of X, Y, and Z; and/or at least one of each of X, Y, and Z.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   identifying an emotion identifier from a network message using an emotion identifier table;
   separating the emotion identifier from the network message, and splitting a remaining portion of the network message into multiple tokens, each of the multiple tokens delimited by a space or a punctuation mark;
   determining a message sentiment score for the network message based on an emotion identifier sentiment score associated with the emotion identifier in the emotion identifier table, and on at least one of the multiple tokens;

adding a first token from the multiple tokens to the emotion identifier table based on a contribution from the first token to the message sentiment score;

associating a sentiment score for the first token in the emotion identifier table based on the contribution of the first token to the message sentiment score; and modifying an emotion identifier sentiment score of the first token when the first token is already included in the emotion identifier table based on the contribution of the first token to the message sentiment score;

wherein adding the first token from the multiple tokens to the emotion identifier table comprises selecting the first token such that the contribution from the first token to the message sentiment score is at least two standard deviations above an average contribution of the multiple tokens to the message sentiment score.

2. The computer-implemented method of claim 1, wherein identifying an emotion identifier from the network message using an emotion identifier table comprises retrieving the emotion identifier from a metadata portion of the network message.

3. The computer-implemented method of claim 1, wherein identifying an emotion identifier from a network message comprises matching a plurality of characters in the network message with an emotion identifier in the emotion identifier table, removing the plurality of characters from the network message when a matching emotion identifier is found, and matching a remaining character string in the network message with a second emotion identifier in the emotion identifier table.

4. The computer-implemented method of claim 1, wherein determining an overall sentiment score for the network message comprises grouping the network message with a second network message in a classification group based on a second emotion identifier sentiment score associated with the second network message, and applying a machine learning algorithm to determine the overall sentiment score based on the classification group.

5. The computer-implemented method of claim 1, wherein determining an overall sentiment score for the network message comprises accessing a network server hosting a social network application, grouping the network message with multiple network messages from the network server to form a plurality of network messages, and applying a machine learning algorithm to the plurality of network messages.

6. The computer-implemented method of claim 1, wherein determining an overall sentiment score for the network message comprises grouping the network message with a plurality of network messages collected over a selected period of time.

7. The computer-implemented method of claim 1, wherein determining an overall sentiment score for the network message comprises grouping the network message with a plurality of network messages collected over a selected geographic area, the method further comprising associating the selected geographic area to the first token in the emotion identifier table.

8. The computer-implemented method of claim 1, wherein determining an overall sentiment score for the network message comprises grouping the network message with a plurality of network messages collected over a selected demographic group, the method further comprising associating the selected demographic group to the first token in the emotion identifier table.

9. A system comprising:
one or more processors; and
a memory coupled to the one or more processors, the memory including instructions that, when executed by the one or more processors, cause the one or more processors to:

identify an emotion identifier from a network message using an emotion identifier table;

separate the emotion identifier from the network message, and splitting a remaining portion of the network message into multiple tokens, each of the multiple tokens delimited by a space or a punctuation mark;

determine a message sentiment score for the network message based on an emotion identifier sentiment score associated with the emotion identifier in the emotion identifier table, and on at least one of the multiple tokens;

add a first token from the multiple tokens to the emotion identifier table based on a contribution from the first token to the message sentiment score;

associate a sentiment score for the first token in the emotion identifier table based on the contribution of the first token to the message sentiment score; and modify an emotion identifier sentiment score of the first token when the first token is already included in the emotion identifier table based on the contribution of the first token to the message sentiment score;

wherein to modify the emotion identifier sentiment score of the first token comprises associating a new emotion identifier sentiment score of the first token with an average of a previous emotion identifier sentiment score of the first token with the contribution of the first token to the message sentiment score.

10. The system of claim 9, wherein to identify an emotion identifier from the network message using an emotion identifier table the one or more processors further execute instructions to retrieve the emotion identifier from a metadata portion of the network message.

11. The system of claim 9, wherein to determine an overall sentiment score for the network message the one or more processors further execute instructions to group the network message with a second network message in a classification group based on a second emotion identifier sentiment score associated with the second network message, and to apply a machine learning algorithm to determine the overall sentiment score based on the classification group.

12. The system of claim 9, wherein to determine an overall sentiment score for the network message the one or more processors are further configured to access a network server hosting a social network application, to group the network message with multiple network messages from the network server to form a plurality of network messages, and to apply a machine learning algorithm to the plurality of network messages.

13. The system of claim 9, wherein to determine an overall sentiment score for the network message the one or more processors are further configured to group the network message with a plurality of network messages collected over a selected period of time.

14. The system of claim 9, wherein to determine an overall sentiment score for the network message the one or more processors are further configured to group the network message with a plurality of network messages collected over a selected geographic area, and to associate the selected geographic area to the first token in the emotion identifier table.

15. A non-transitory, computer readable storage medium comprising instructions which, when executed by a processor in a computer, cause the computer to execute a method, the method comprising:
- identifying an emotion identifier from a network message using an emotion identifier table;
- separating the emotion identifier from the network message, and splitting a remaining portion of the network message into multiple tokens, each of the multiple tokens delimited by a space or a punctuation mark;
- determining a message sentiment score for the network message based on an emotion identifier sentiment score associated with the emotion identifier in the emotion identifier table, and on at least one of the multiple tokens;
- adding a first token from the multiple tokens to the emotion identifier table based on a contribution from the first token to the message sentiment score;
- associating a sentiment score for the first token in the emotion identifier table based on the contribution of the first token to the message sentiment score; and
- modifying an emotion identifier sentiment score of the first token when the first token is already included in the emotion identifier table based on the contribution of the first token to the message sentiment score;
- wherein determining an overall sentiment score for the network message comprises grouping the message with a second message in a classification group based on a second emotion identifier sentiment score associated with the second message, and applying a machine learning algorithm to determine the overall sentiment score based on the classification group.

16. The non-transitory, computer-readable storage medium of claim 15, wherein identifying an emotion identifier from the network message using an emotion identifier table comprises retrieving the emotion identifier from a metadata portion of the network message.

17. The non-transitory, computer-readable storage medium of claim 15, wherein determining the overall sentiment score for the network message comprises accessing a network server hosting a social network application, grouping the network message with multiple network messages from the network server to form a plurality of network messages, and applying the machine learning algorithm to the plurality of network messages.

* * * * *